United States Patent
Wang et al.

(10) Patent No.: US 8,512,920 B2
(45) Date of Patent: Aug. 20, 2013

(54) COLOR FILTER SUBSTRATE AND COLOR DISPLAY APPARATUS

(75) Inventors: Yi-Ching Wang, Hsinchu (TW);
Jui-Chung Cheng, Hsinchu (TW);
Tzu-Ming Wang, Hsinchu (TW);
Ted-Hong Shinn, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 915 days.

(21) Appl. No.: 12/641,300

(22) Filed: Dec. 17, 2009

(65) Prior Publication Data

US 2011/0068998 A1   Mar. 24, 2011

(30) Foreign Application Priority Data

Sep. 23, 2009  (TW) .................. 98132071 A

(51) Int. Cl.
*G02B 5/20* (2006.01)
(52) U.S. Cl.
USPC ............................................................. 430/7
(58) Field of Classification Search
None
See application file for complete search history.

(56) References Cited

U.S. PATENT DOCUMENTS

2008/0192186 A1*  8/2008  Nakagawa .................... 349/106

FOREIGN PATENT DOCUMENTS

| CN | 1831601 A | 9/2006 |
| JP | 04-296721 A | 10/1992 |
| JP | 08-297207 A | 12/1996 |
| JP | 10-221518 A * | 8/1998 |
| JP | 2004-012609 A | 1/2004 |
| TW | 200928492 A | 7/2009 |

OTHER PUBLICATIONS

Computer-generated translation of JP 10-221518 (Aug. 1998).*

* cited by examiner

*Primary Examiner* — John A. McPherson
(74) *Attorney, Agent, or Firm* — Chun-Ming Shih

(57) ABSTRACT

A color filter substrate includes a transparent substrate, a color photoresist layer and an air guiding layer. The color photoresist layer is disposed on the transparent substrate. The air guiding layer is disposed on the substrate and surrounds the color photoresist layer. The air guiding layer includes a plurality of strip-shaped patterns disposed apart from each other. One end of each of the strip-shaped patterns is connected to the color photoresist layer, and the other end of each of the strip-shaped patterns extends toward a direction far away from the color photoresist layer. An air guiding groove is formed between each two adjacent strip-shaped patterns. A color display apparatus having the color filter substrate is also provided. The color filter substrate can be assembled to the display layer without producing air bubbles, and thereby improves display quality of the color display apparatus.

17 Claims, 3 Drawing Sheets

COLOR FILTER SUBSTRATE AND COLOR DISPLAY APPARATUS

CROSS-REFERENCE TO RELATED APPLICATIONS

This application is based upon and claims the benefit of priority from the prior Taiwanese Patent Application No. 098132071, filed Sep. 23, 2009, the entire contents of which are incorporated herein by reference.

BACKGROUND

1. Field of the Invention

The present invention relates to a color display apparatus, and particularly to a color filter substrate and a color display apparatus having the color filter substrate.

2. Description of Related Art

With the advancement of the flat display technology and due to the flat display apparatuses having advantages of light in weight, small in size and low power consuming, the flat display apparatuses have become more and more popular. In general, the flat display apparatuses include liquid crystal display (LCD) apparatuses, plasma display panel (PDP) apparatuses, organic light emitting diode (OLED) display apparatuses and electrophoretic display (EPD) apparatuses, etc., wherein the electrophoretic display apparatus does not include light emitting source, so the electrophoretic display apparatus further has the advantage of power saving in comparison with other flat display apparatuses.

The earlier electrophoretic display apparatus is a monochrome display apparatus, but for improving a market competitiveness of the electrophoretic display apparatus, a color filter substrate is used in conventional technique to enable the electrophoretic display apparatus to display color images. Such that, the electrophoretic display apparatus can achieve color display capability.

FIG. 1 is a schematic cross-section view of a conventional electrophoretic display apparatus. Referring to FIG. 1, the conventional electrophoretic display apparatus 300 includes a bottom substrate 310, a front plane laminate (FPL) 320 and a color filter substrate 330. The bottom substrate 310 has a drive circuitry layer 312, the front plane laminate 320 is disposed on the drive circuitry layer 312, and the color filter substrate 330 is disposed on the front plane laminate 320. Moreover, the drive circuitry layer 312 includes a plurality of pixel electrodes (not shown). The front plane laminate 320 includes an electrophoretic layer 322 and a transparent electrode layer 324 disposed on the electrophoretic layer 322. The electrophoretic layer 322 includes a plurality of black charged particles 323$b$ and a plurality of white charged particles 323$w$, wherein the black charged particles 323$b$ and the white charged particles 323$w$ have different electrical properties. The white charged particles 323$w$ and the black charged particles 323$b$ in the electrophoretic layer 322 are driven toward different directions by changing electrical fields between the pixel electrodes and the transparent electrode layer 324, and such that the electrophoretic display apparatus 300 is capable of displaying different images.

Furthermore, the color filter substrate 330 includes a plurality of red photoresists 332$r$, a plurality of green photoresists 332$g$ and a plurality of blue photoresists 332$b$, and the photoresists 332$r$, 332$b$ and 332$g$ are separated by a black matrix 334. The red photoresists 332$r$, the green photoresists 332$g$ and the blue photoresists 332$b$ are respectively used to filter white light into red light, green light and blue light so as to enable the electrophoretic display apparatus 300 to display color images.

The color filter substrate 330 disposed on the front plane laminate 320 enables the electrophoretic display apparatus 300 to display color images. However, due to the front plane laminate 320 and the color filter substrate 330 being rigid substrates, air bubbles are easily formed during assembling the color filter substrate 330 with the front plane laminate 320. The air bubbles result in gaps existed between the front plane laminate 320 and the color filter substrate 330, so the color filter substrate 330 can not be flatly attached to the front plane laminate 320. Such that, display quality of the conventional electrophoretic display apparatus 300 is reduced, and even yield of the conventional electrophoretic display apparatus 300 is reduced.

Moreover, in the conventional technique, a vacuum deaeration process is preformed to eliminate air bubbles existed between the color filter substrate 330 and the front plane laminate 320, but manufacturing time and cost of the electrophoretic display apparatus 300 are consequently increased.

BRIEF SUMMARY

The present invention provides a color filter substrate to avoid air bubbles formed between a color filter substrate and a display layer.

The present invention further provides a color display apparatus having high display quality and yield.

To achieve the above-mentioned advantages, the present provides a color filter substrate including a transparent substrate, a color photoresist layer and an air guiding layer. The color photoresist layer is disposed on the transparent substrate. The air guiding layer is disposed on the transparent substrate and surrounds the color photoresist layer. The air guiding layer includes a plurality of strip-shaped patterns disposed apart from each other. One end of each of the strip-shaped patterns is connected to the color photoresist layer, and the other end of each of the strip-shaped patterns extends toward a direction far away from the color photoresist layer, wherein an air guiding groove is formed between each two adjacent strip-shaped patterns.

In an embodiment of the present invention, the color photoresist layer has a first edge, a second edge connected to the first edge, a third edge opposite to the first edge and a forth edge opposite to the second edge. The strip-shaped patterns of the air guiding layer are respectively connected to the first edge, the second edge, the third edge and the forth edge. The strip-shaped patterns connected to the first edge extend in same direction, the strip-shaped patterns connected to the second edge extend in same direction, the strip-shaped patterns connected to the third edge extend in same direction, and the strip-shaped patterns connected to the forth edge extend in same direction.

In an embodiment of the present invention, the strip-shaped patterns connected to the first edge and the strip-shaped patterns connected to the third edge extend in same direction and are respectively perpendicular to the first edge and the third edge. The strip-shaped patterns connected to the second edge and the strip-shaped patterns connected to the forth edge extend in same direction and are respectively perpendicular to the second edge and the forth edge.

In an embodiment of the present invention, thickness of the color photoresist layer is equal to or smaller than thickness of the air guiding layer.

In an embodiment of the present invention, material of the air guiding layer includes transparent photoresist material or color photoresist material.

In an embodiment of the present invention, width of each of the air guiding grooves is equal to width of each color filter pattern of the color photoresist layer.

In an embodiment of the present invention, the color filter substrate further includes a black matrix layer disposed on the transparent substrate, wherein color filter patterns of the color photoresist layer are separated by the black matrix layer.

In an embodiment of the present invention, material of the transparent substrate includes glass, polyimide (PI), polyester (PET), polyethylene naphthalate (PEN), polymethyl methacrylate (PMMA) or polycarbonate (PC).

To achieve the above-mentioned advantages, the present invention further provides a color display apparatus including a base plate, a display layer and the above-mentioned color filter substrate. The display layer is disposed on the base plate and the color filter substrate is disposed on the display layer.

In an embodiment of the present invention, each of the strip-shaped patterns extends from inside a border of the display layer to outside the border of the display layer.

In an embodiment of the present invention, material of the base plate comprises glass, plastic or stainless steel.

In an embodiment of the present invention, the display layer comprises a microcapsule electrophoretic display layer, a microcup electrophoretic display layer, a liquid crystal display layer, a liquid powder display layer, a microelectromechanical display layer, an electrowetting display layer or an active matrix organic light emitting diode display layer.

In an embodiment of the present invention, the color display apparatus is an active matrix display apparatus or a passive matrix display apparatus.

In the color filter substrate of the present invention, the air guiding layer surrounding the color photoresist layer is disposed on the transparent substrate, and the air guiding groove is formed between each two adjacent strip-shaped patterns of the air guiding layer. Air can be exhausted from the air guiding grooves to prevent air bubbles from being formed between the color filter substrate and the display layer when the color filter substrate is assembled with the display layer. Moreover, in the color display apparatus of the present invention, there should be no air bubbles formed between the color filter substrate and the display layer, so the display quality and the yield of the color display apparatus can be improved and a manufacturing cost of the color display apparatus is consequently improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
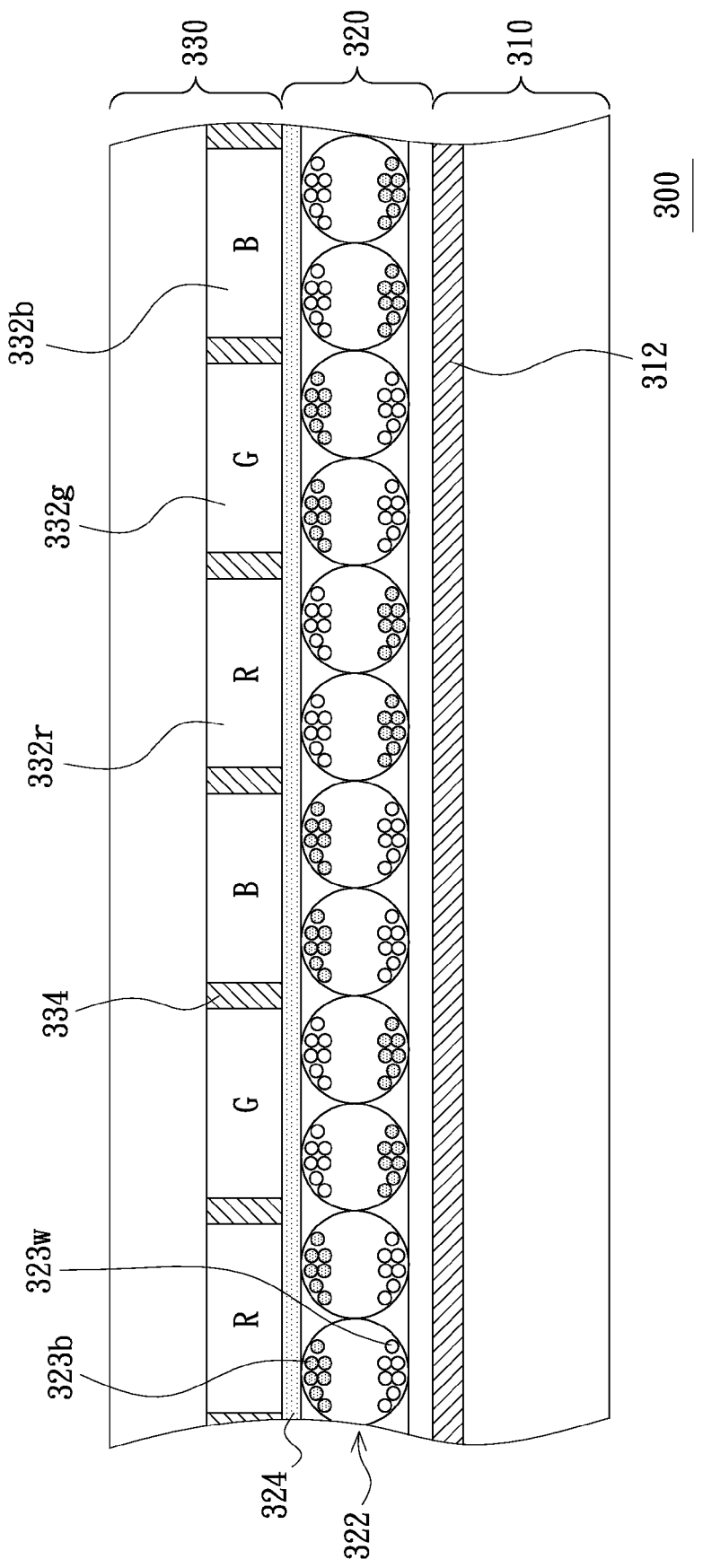
FIG. 1 is a schematic cross-section view of a conventional electrophoretic display apparatus.
Figure 2:
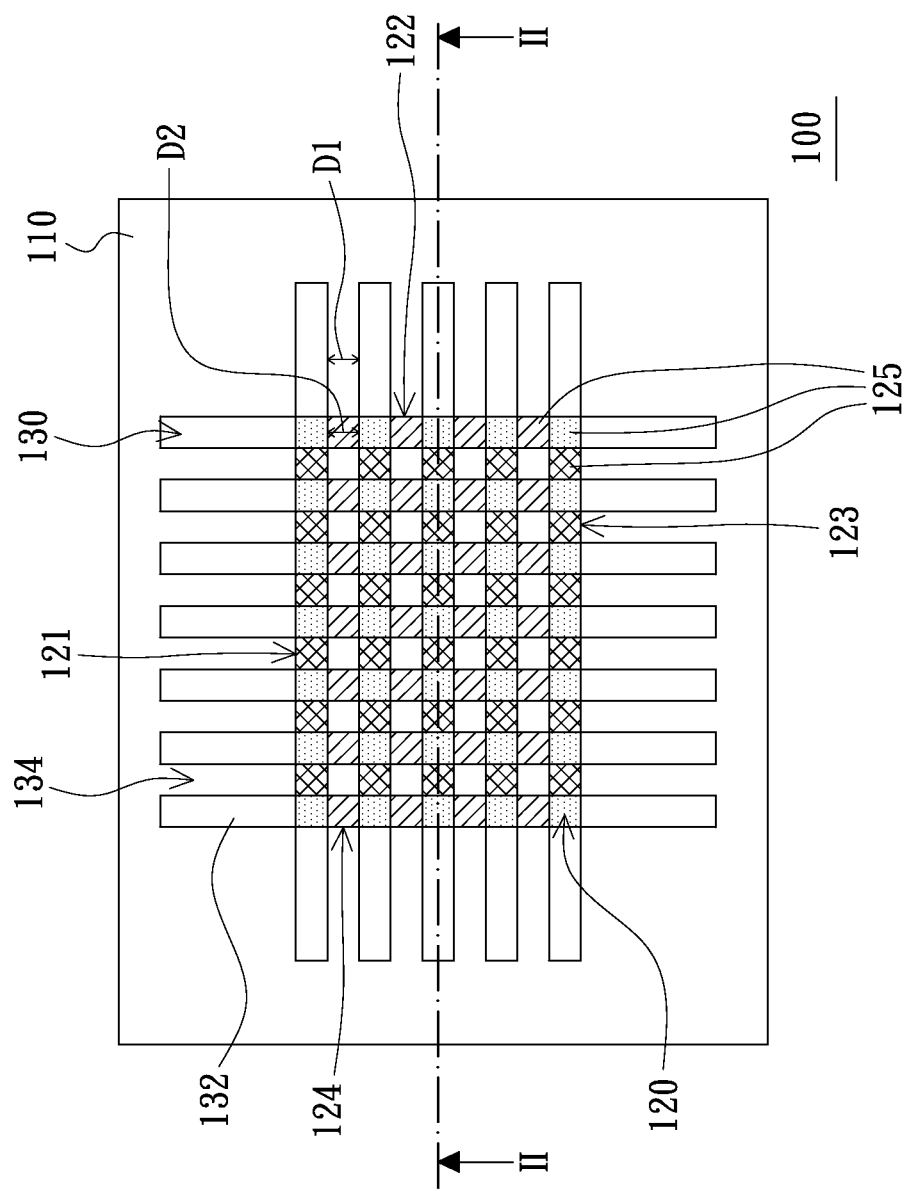
FIG. 2 is a schematic top view of a color filter substrate according to an embodiment of the present invention.
Figure 3:
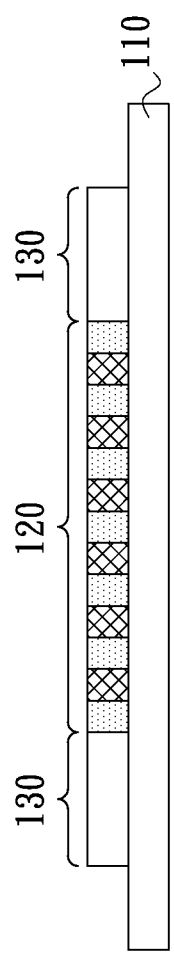
FIG. 3 is a schematic cross-section view along line II-II of FIG. 2.

FIG. 2 is a schematic top view of a color filter substrate according to an embodiment of the present invention, and FIG. 3 is a schematic cross-section view along line II-II of FIG. 2. Referring to FIGS. 2 and 3, the color filter substrate 100 of the present embodiment includes a transparent substrate 110, a color photoresist layer 120 and an air guiding layer 130. The color photoresist layer 120 is disposed on the transparent substrate 110, and the air guiding layer 130 is disposed on the transparent substrate 110 and surrounds the color photoresist layer 120.

In the color filter substrate 100, material of the transparent substrate 110 can be transparent material such as glass, polyimide, polyester, polyethylene naphthalate, polymethyl methacrylate or polycarbonate.

In the present embodiment, the color photoresist layer 120, for example, has a first edge 121, a second edge 122 connected to the first edge 121, a third edge 123 opposite to the first edge 121 and a forth edge 124 opposite to the second edge 122. The color photoresist layer 120 includes a plurality of color filter patterns 125. The color filter patterns 125 can include multiple colors such as, but not limited to, red, green and blue. Furthermore, arrangement of colors of the color filter patterns 125 is not limited to FIG. 2. Moreover, the color filter substrate 100 can further include a black matrix layer (not shown) disposed on the transparent substrate 110. The color filter patterns 125 of the color photoresist layer 120 are separated by the black matrix layer. The color photoresist layer 120 can be formed by common method in the art. More specifically, the common method in the art may be performing steps such as priming, exposure, development and hard back etc. to form different color filter patterns 125 on the transparent substrate 110 in sequence, but the present embodiment does not limit the method for forming the color photoresist layer 120.

The air guiding layer 130 includes a plurality of strip-shaped patterns 132 disposed apart from each other. One end of each of the strip-shaped patterns 132 is connected to the color photoresist layer 120, and the other end of each of the strip-shaped patterns 132 extends toward a direction far away from the color photoresist layer 120, wherein an air guiding groove 134 is formed between each two adjacent strip-shaped patterns 132. Moreover, width D1 of each of the air guiding grooves 134 is, for example, equal to width D2 of each of the color filter patterns 125. Thickness of the color photoresist layer 120 is, for example, equal to or smaller than thickness of the air guiding layer 130.

Material of the air guiding layer 130 can be transparent photoresist material (e.g. polymethyl methacrylate or acrylic resin etc.) or color photoresist material. The air guiding layer 130 can be formed by common method in the art. More specifically, the common method in the art may be performing steps such as priming, exposure, development and hard back etc. to form the air guiding layer on the transparent substrate 110, but the present embodiment does not limit the method for forming the air guiding layer 130.

In the present embodiment, the strip-shaped patterns 132 of the air guiding layer 130 are, for example, respectively connected to the first edge 121, the second edge 122, the third edge 123 and the forth edge 124 of the color photoresist layer 120. The strip-shaped patterns 132 connected to the first edge 121 extend in same direction. The strip-shaped patterns 132 connected to the second edge 122 extend in same direction. The strip-shaped patterns 132 connected to the third edge 123 extend in same direction. The strip-shaped patterns 132 connected to the forth edge 124 extend in same direction. More specifically, the strip-shaped patterns 132 connected to the first edge 121 and the strip-shaped patterns 132 connected to the third edge 123 extend in same direction and are respectively perpendicular to the first edge 121 and the third edge 123. The strip-shaped patterns 132 connected to the second edge 122 and the strip-shaped patterns 132 connected to the forth edge 124 extend in same direction and are respectively perpendicular to the second edge 122 and the forth edge 124.

It should be understood that the present embodiment does not limit the extending directions of the strip-shaped patterns 132. For example, the strip-shaped patterns 132 connected to the first edge 121 can extend in different directions, and the strip-shaped patterns 132 connected to the first edge 121 and the strip-shaped patterns 132 connected the third edge 123 can extend in different directions. The strip-shaped patterns 132 connected to the second edge 122 can extend in different directions, and the strip-shaped patterns 132 connected to the second edge 122 and the strip-shaped patterns 132 connected to the forth edge 124 can extend in different directions. Detail description of other embodiments about the extending directions of the strip-shaped patterns 132 is omitted.

Figure 4:
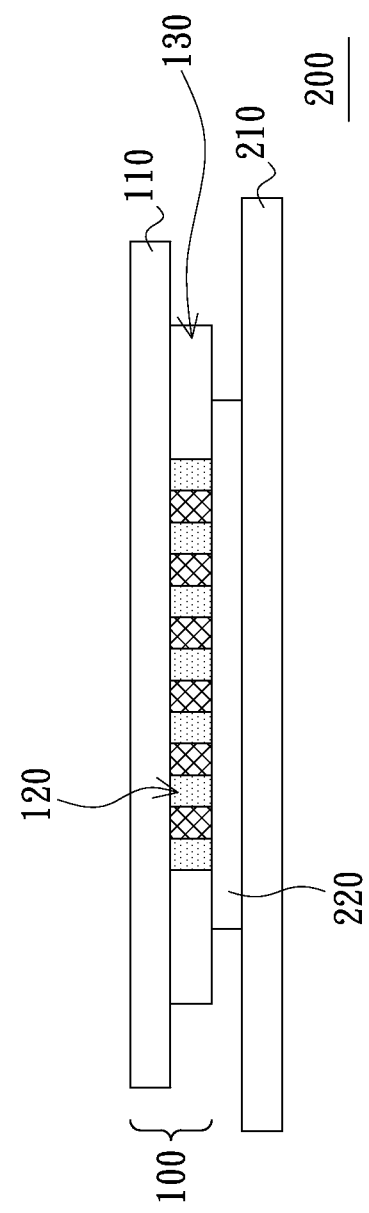
FIG. 4 is a schematic cross-section view of a color display apparatus according to an embodiment of the present invention.

The color filter substrate 100 is adapted to be disposed on a display layer of a display apparatus in order to enable the display apparatus to display color image. A color display apparatus will be exemplified to explain an application of the color filter substrate 100. FIG. 4 is a schematic cross-section view of a color display apparatus according to an embodiment of the present invention. Referring to FIGS. 2 and 4, the color display apparatus 200 of the present embodiment includes a base plate 210, a display layer 220 and the color filter substrate 100. The display layer 220 is disposed on the base plate 210, and the color filter substrate 100 is disposed on the display layer 210.

Material of the base plate 210 can be, but not limited to, glass, plastic or stainless steel. The plastic can be polyimide, polyester, polyethylene naphthalate, polymethyl methacrylate or polycarbonate. The material of the base plate 210 also can be other metal alloy.

The display layer 220 can be, but not limited to, a microcapsule electrophoretic display layer, a microcup electrophoretic display layer, a liquid crystal display layer, a liquid powder display layer, a microelectromechanical display layer, an electrowetting display layer, an active matrix organic light emitting diode display layer or a cholesterol liquid crystal display layer according to a type of the color display apparatus 200. In one embodiment that the display layer 220 is the microcapsule electrophoretic display layer, the display layer 220 is, for example a front plane laminate. Moreover, the color display apparatus 200 can be an active matrix display apparatus or a passive matrix display apparatus according to a driving type of the color display apparatus 200.

In the present embodiment, the color photoresist layer 120 of the color filter substrate 100 is attached to the air guiding layer 130 and the display layer 220, wherein each of the strip-shaped patterns 132 of the air guiding layer 130 extends from inside a border of the display layer 220 to outside the border of the display layer 220. Therefore, air between the color filter substrate 100 and the display layer 220 can be exhausted from the air guiding grooves 134 of the air guiding layer 130 so as to prevent air bubbles from being formed between the color filter substrate 100 and the display layer 220 when the color filter substrate 100 is assembled to the display layer 220. Such that, a display quality of the color display apparatus 200 is improved and yield of the color display apparatus 200 is also improved. Moreover, there should be no air bubbles formed between the display layer 220 and the color filter substrate 100, so other process for eliminating the air bubbles can be omitted. Therefore, manufacturing efficiency of the color display apparatus 200 is improved, and manufacturing cost of the display apparatus 200 is consequently reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A color filter substrate comprising:
a transparent substrate;
a color photoresist layer disposed on the transparent substrate; and
an air guiding layer disposed on the transparent substrate and surrounding the color photoresist layer, the air guiding layer comprising a plurality of strip-shaped patterns disposed apart from each other, one end of each of the strip-shaped patterns being connected to the color photoresist layer, the other end of each of the strip-shaped patterns extending toward a direction far away from the color photoresist layer, and an air guiding groove being formed between each two adjacent strip-shaped patterns,
wherein width of each of the air guiding grooves is equal to width of each color filter pattern of the color photoresist layer.

2. The color filter substrate as claimed in claim 1, wherein the color photoresist layer has a first edge, a second edge connected to the first edge, a third edge opposite to the first edge and a forth edge opposite to the second edge, the strip-shaped patterns of the air guiding layer are respectively connected to the first edge, the second edge, the third edge and the forth edge, the strip-shaped patterns connected to the first edge extend in same direction, the strip-shaped patterns connected to the second edge extend in same direction, the strip-shaped patterns connected to the third edge extend in same direction, and the strip-shaped patterns connected to the forth edge extend in same direction.

3. The color filter substrate as claimed in claim 2, wherein the strip-shaped patterns connected to the first edge and the strip-shaped patterns connected to the third edge extend in same direction and are respectively perpendicular to the first edge and the third edge, the strip-shaped patterns connected to the second edge and the strip-shaped patterns connected to the forth edge extend in same direction and are respectively perpendicular to the second edge and the forth edge.

4. The color filter substrate as claimed in claim 1, wherein thickness of the color photoresist layer is equal to or smaller than thickness of the air guiding layer.

5. The color filter substrate as claimed in claim 1, wherein material of the air guiding layer comprises transparent photoresist material or color photoresist material.

6. The color filter substrate as claimed in claim 1 further comprising a black matrix layer disposed on the transparent substrate, wherein color filter patterns of the color photoresist layer are separated by the black matrix layer.

7. The color filter substrate as claimed in claim 1, wherein material of the transparent substrate comprises glass, polyimide, polyester, polyethylene naphthalate, polymethyl methacrylate or polycarbonate.

8. A color display apparatus comprising:
a base plate;
a display layer disposed on the base plate; and
a color filter substrate disposed on the display layer, and the color filter substrate comprising:
a transparent substrate;
a color photoresist layer disposed on the transparent substrate; and
an air guiding layer disposed on the transparent substrate and surrounding the color photoresist layer, the air guiding layer comprising a plurality of strip-shaped patterns disposed apart from each other, one end of each of the strip-shaped patterns being connected to the color photoresist layer, the other end of each of the strip-shaped patterns extending toward a direction far away from the color photoresist layer, and an air guiding groove being formed between each two adjacent strip-shaped patterns,
wherein width of each of the air guiding grooves is equal to width of each color filter pattern of the color photoresist layer.

9. The color display apparatus as claimed in claim 8, wherein each of the strip-shaped patterns extends from inside a border of the display layer to outside the border of the display layer.

10. The color display apparatus as claimed in claim 8, wherein the color photoresist layer has a first edge, a second edge connected to the first edge, a third edge opposite to the first edge and a forth edge opposite to the second edge, the strip-shaped patterns of the air guiding layer are respectively connected to the first edge, the second edge, the third edge and the forth edge, the strip-shaped patterns connected to the first edge extend in same direction, the strip-shaped patterns connected to the second edge extend in same direction, the strip-shaped patterns connected to the third edge extend in same direction, and the strip-shaped patterns connected to the forth edge extend in same direction.

11. The color display apparatus as claimed in claim 10, wherein the strip-shaped patterns connected to the first edge and the strip-shaped patterns connected to the third edge extend in same direction and are respectively perpendicular to the first edge and the third edge, the strip-shaped patterns connected to the second edge and the strip-shaped patterns connected to the forth edge extend in same direction and are respectively perpendicular to the second edge and the forth edge.

12. The color display apparatus as claimed in claim 8, wherein thickness of the color photoresist layer is equal to or smaller than thickness of the air guiding layer.

13. The color display apparatus as claimed in claim 8, wherein material of the air guiding layer comprises transparent photoresist material or color photoresist material.

14. The color display apparatus as claimed in claim 8, wherein material of the base plate comprises glass, plastic or stainless steel.

15. The color display apparatus as claimed in claim 8, wherein the display layer comprises a microcapsule electrophoretic display layer, a microcup electrophoretic display layer, a liquid crystal display layer, a liquid powder display layer, a microelectromechanical display layer, an electrowetting display layer or an active matrix organic light emitting diode display layer.

16. The color display apparatus as claimed in claim 8 being an active matrix display apparatus or a passive matrix display apparatus.

17. A color filter substrate comprising:
a transparent substrate;
a color photoresist layer disposed on the transparent substrate; and
an air guiding layer disposed on the transparent substrate and surrounding the color photoresist layer, the air guiding layer comprising a plurality of strip-shaped patterns disposed apart from each other, one end of each of the strip-shaped patterns being connected to the color photoresist layer, the other end of each of the strip-shaped patterns extending toward a direction far away from the color photoresist layer, and an air guiding groove being formed between each two adjacent strip-shaped patterns to exhaust air so as to prevent air bubbles.

* * * * *